US012243341B2

(12) United States Patent
Baba et al.

(10) Patent No.: US 12,243,341 B2
(45) Date of Patent: Mar. 4, 2025

(54) PROCESSING APPARATUS, PROCESSING METHOD, AND NON-STRATEGY MEDIUM

(71) Applicants: SHINKIN INFORMATION SERVICE LTD., Tokyo (JP); NEC CORPORATION, Tokyo (JP)

(72) Inventors: Eiichi Baba, Tokyo (JP); Hiroshi Chiba, Tokyo (JP)

(73) Assignees: SHINKIN INFORMATION SERVICE LTD., Tokyo (JP); NEC CORPORATION, Tokyo (JP)

( * ) Notice: Subject to any disclaimer, the term of this patent is extended or adjusted under 35 U.S.C. 154(b) by 278 days.

(21) Appl. No.: 17/602,397

(22) PCT Filed: Apr. 24, 2020

(86) PCT No.: PCT/JP2020/017608
§ 371 (c)(1),
(2) Date: Oct. 8, 2021

(87) PCT Pub. No.: WO2020/218471
PCT Pub. Date: Oct. 29, 2020

(65) Prior Publication Data
US 2022/0165076 A1 May 26, 2022

(30) Foreign Application Priority Data
Apr. 24, 2019 (JP) ................................. 2019-082587

(51) Int. Cl.
*G06V 30/42* (2022.01)
*G06V 30/12* (2022.01)
(Continued)

(52) U.S. Cl.
CPC .............. *G06V 30/42* (2022.01); *G06V 30/12* (2022.01); *G06V 30/19* (2022.01); *G06V 30/26* (2022.01); *G06V 30/416* (2022.01)

(58) Field of Classification Search
CPC ........ G06V 30/10; G06V 30/12; G06V 30/19; G06V 30/26; G06V 30/42; G06V 30/416
See application file for complete search history.

(56) References Cited

U.S. PATENT DOCUMENTS

2009/0317003 A1* 12/2009 Heilper ................ G06V 30/268
382/229
2012/0265655 A1 10/2012 Stroh
2021/0110152 A1* 4/2021 Noda .................... G06V 30/416

FOREIGN PATENT DOCUMENTS

CN 101573725 A 11/2009
JP 11-328285 A 11/1999
(Continued)

OTHER PUBLICATIONS

Osamu (Computer English Translation of Japanese Patent No. JP2002-92546), pp. 1-7. (Year: 2002).*
(Continued)

*Primary Examiner* — Daniel G Mariam
(74) *Attorney, Agent, or Firm* — Sughrue Mion, PLLC

(57) ABSTRACT

The present invention provides a processing apparatus (10) including an acquisition unit (11) that acquires an image of a fill-in form including a plurality of first fill-in fields where a numerical value is filled in, and a second fill-in field where a sum total of the numerical values filled in a plurality of the first fill-in fields is filled in, an analysis unit (12) that analyzes the image, and recognizes the value filled in a plurality of the first fill-in fields and the value filled in the second fill-in field, a determination unit (13) that determines whether a sum total of recognition results of the value filled in a plurality of the first fill-in fields and a recognition result of the value filled in the second fill-in field match each other, and a processing unit (14) that executes error processing when a sum total of the recognition results of the value filled in a plurality of the first fill-in fields and the recognition
(Continued)

result of the value filled in the second fill-in field do not match each other.

11 Claims, 10 Drawing Sheets

(51) Int. Cl.
*G06V 30/19* (2022.01)
*G06V 30/26* (2022.01)
*G06V 30/416* (2022.01)

(56) References Cited

FOREIGN PATENT DOCUMENTS

| | | | |
|---|---|---|---|
| JP | 2000-163491 A | 6/2000 | |
| JP | 2000-276541 A | 10/2000 | |
| JP | 2001-022883 A | 1/2001 | |
| JP | 2001-076093 A | 3/2001 | |
| JP | 2002-092546 A | 3/2002 | |
| JP | 2005-100385 A | 4/2005 | |
| JP | 2005-352529 A | 12/2005 | |
| JP | 2006-4263 A | 1/2006 | |
| JP | 2009-129097 A | 6/2009 | |
| JP | 2012-185672 A | 9/2012 | |
| JP | 2013-134543 A | 7/2013 | |
| JP | 2015-090625 A | 5/2015 | |
| JP | 2016-18353 A | 2/2016 | |
| JP | 2018-22230 A | 2/2018 | |
| KR | 10-2010-0027655 A | 3/2010 | |

OTHER PUBLICATIONS

Osamu (hereinafter "Osmu-2") (Computer English Translation of Japanese Patent No. JP200176093), pp. 1-7. (Year: 2001).*
Tomotsugu (Computer English Translation of Japanese Patent No. JP2000-163491 A), pp. 1-9. (Year: 2000).*
Toshikazu, et al. (Computer English Translation of Japanese Patent No. JP4350218 B2), pp. 1-8. (Year: 2009).*
Notification of Reasons for Refusal dated Feb. 21, 2023 from the Japanese Patent Office in application No. 2021-516234.
Communication dated Nov. 1, 2022 from the Japanese Patent Office in Application No. 2021-516234.
International Search Report for PCT/JP2020/017608 dated, Jul. 14, 2020 (PCT/ISA/210).
Chinese Office Action issued Jun. 12, 2023 in Application No. 202080030860.3.
Office Action issued Mar. 28, 2024 in Chinese Application No. 202080030860.3.

* cited by examiner

| ITEM | SPECIFIABLE DATE |
|---|---|
| CURRENT | CURRENT |
| ADVANCE TRANSFER | 1 TO 5 BUSINESS DAYS FROM NOW |
| SALARY | 2 TO 5 BUSINESS DAYS FROM NOW |
| ⋮ | ⋮ |

FIG. 10

| CUSTOMER NUMBER | REGISTRATION INFORMATION |
|---|---|
| 0013289 | . . . . |
| ⋮ | ⋮ |

PROCESSING APPARATUS, PROCESSING METHOD, AND NON-STRATEGY MEDIUM

CROSS REFERENCE TO RELATED APPLICATIONS

This application is a National Stage of International Application No. PCT/JP2020/017608 filed Apr. 24, 2020, claiming priority based on Japanese Patent Application No. 2019-082587 filed Apr. 24, 2019.

TECHNICAL FIELD

The present invention relates to a processing apparatus, a processing method, and a program.

BACKGROUND ART

Patent Document 1 discloses a system that, when recognition results of a customer fill-in amount and an operator double entry amount mismatch, leaves a display region of a character on a correction screen in blank, and causes a confirmer to input a character.

Patent Document 2 discloses a financial system formed by network-connecting a terminal apparatus operated by an operator to a server that performs data processing. In the financial system, for each of a plurality of slips, a sum total slip including at least data indicating a sum total of amounts processed in each slip and a priority degree of processing is generated, and the data of the sum total slip are stored in a server. Then, the server receives at least an input of data of an amount from each slip compiled by the sum total slip, figures out a sum total, and performs a determination of an amount by performing a check against the stored data of the sum total slip. Moreover, the server determines a priority degree of processing from the data of the sum total slip, and allocates the processing to the terminal apparatus.

RELATED DOCUMENT

Patent Document

[Patent Document 1] Japanese Patent Application Publication No. 2001-76093
[Patent Document 2] Japanese Patent Application Publication No. H11-328285

DISCLOSURE OF THE INVENTION

Technical Problem

Recognition of a content filled in a transfer form is in practice by utilizing optical character recognition (OCR). However, recognition accuracy by OCR is not 100%, there is a possibility of erroneous recognition, and, therefore, human confirmation work is needed before transfer processing is executed. A burden reduction of the human confirmation work is desired. The present invention challenges provision of a technique for detecting erroneous recognition by OCR.

Solution to Problem

The present invention provides a processing apparatus including:
an acquisition means for acquiring an image of a fill-in form including a plurality of first fill-in fields where a numerical value is filled in, and a second fill-in field where a sum total of the numerical values filled in a plurality of the first fill-in fields is filled in;
an analysis means for analyzing the image, and recognizing a value filled in a plurality of the first fill-in fields and a value filled in the second fill-in field;
a determination means for determining whether a sum total of recognition results of a value filled in a plurality of the first fill-in fields and a recognition result of a value filled in the second fill-in field match each other; and
a processing means for executing error processing when a sum total of recognition results of a value filled in a plurality of the first fill-in fields and a recognition result of a value filled in the second fill-in field do not match each other.

Moreover, the present invention provides a processing apparatus including:
an acquisition means for acquiring an image of a transfer request form including a plurality of fill-in fields;
an analysis means for recognizing, with a plurality of image analysis engines, a value in the plurality of fill-in fields included in the transfer request form;
a search means for searching a storage unit with, as a key, a recognition result of a value filled in a key fill-in field of each of a plurality of the image analysis engines;
a determination means for determining whether a value satisfying an error condition is present in recognition results of values in a plurality of fill-in fields by a plurality of the image analysis engines; and
a processing means for executing error processing when recognition results of a plurality of the image analysis engines do not match one another, when the key generated by any of a plurality of the image analysis engines cannot be found in the storage unit, or when a value satisfying the error condition is present in recognition results of values in a plurality of fill-in fields by a plurality of the image analysis engines.

Moreover, the present invention provides a processing method including:
by a computer,
acquiring an image of a fill-in form including a plurality of first fill-in fields where a numerical value is filled in, and a second fill-in field where a sum total of the numerical values filled in a plurality of the first fill-in fields is filled in;
analyzing the image, and recognizing a value filled in a plurality of the first fill-in fields and a value filled in the second fill-in field;
determining whether a sum total of recognition results of a value filled in a plurality of the first fill-in fields and a recognition result of a value filled in the second fill-in field match each other; and
executing error processing when a sum total of recognition results of a value filled in a plurality of the first fill-in fields and a recognition result of a value filled in the second fill-in field do not match each other.

Moreover, the present invention provides a program that causes a computer to function as:
an acquisition means for acquiring an image of a fill-in form including a plurality of first fill-in fields where a numerical value is filled in, and a second fill-in field where a sum total of the numerical values filled in a plurality of the first fill-in fields is filled in;
an analysis means for analyzing the image, and recognizing a value filled in a plurality of the first fill-in fields and a value filled in the second fill-in field;

a determination means for determining whether a sum total of recognition results of a value filled in a plurality of the first fill-in fields and a recognition result of a value filled in the second fill-in field match each other; and a processing means for executing error processing when a sum total of recognition results of a value filled in a plurality of the first fill-in fields and a recognition result of a value filled in the second fill-in field do not match each other.

Advantageous Effects of Invention

The present invention achieves a technique for detecting erroneous recognition by OCR.

BRIEF DESCRIPTION OF THE DRAWINGS

The above-described object, other objects, features, and advantages effects will become more apparent from a preferred example embodiment described below and the following accompanying drawings.

FIG. 6 is a diagram illustrating one example of a fill-in form according to the present example embodiment.

FIG. 7 is a diagram schematically illustrating one example of information processed by the processing apparatus according to the present example embodiment.

FIG. 10 is a diagram schematically illustrating one example of information processed by the processing apparatus according to the present example embodiment.

DESCRIPTION OF EMBODIMENTS

First Example Embodiment

First, an outline of a processing apparatus according to the present example embodiment is described. The processing apparatus according to the present example embodiment is utilized in a financial institution such as a bank.

Figure 1:
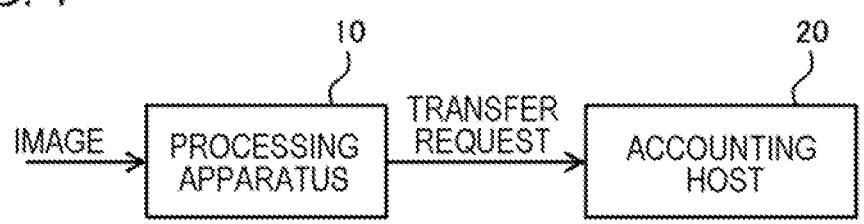
FIG. 1 is a diagram illustrating an outline of a processing apparatus according to the present example embodiment.
Figure 2:
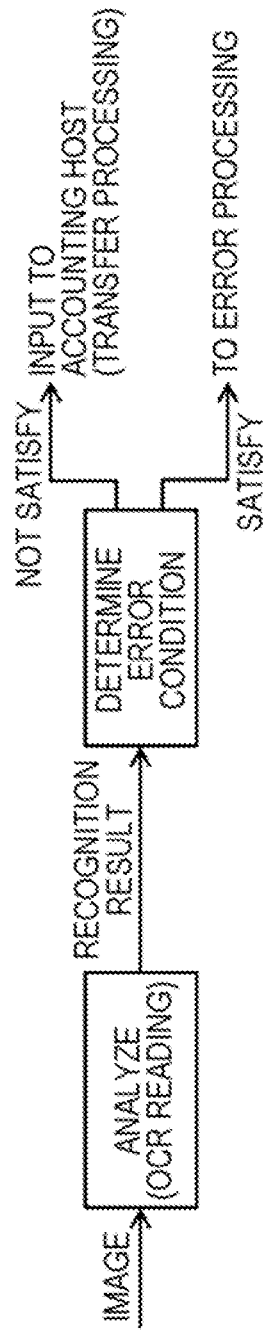
FIG. 2 is a diagram illustrating an outline of the processing apparatus according to the present example embodiment.

As illustrated in FIG. 1, a processing apparatus 10 cooperates with an accounting host 20 that executes transfer processing. First, before transfer processing by the accounting host 20 is executed, an image (image data) of a transfer request form (a fill-in form) generated by an image scanner or the like is input to the processing apparatus 10. An outline of a flow of processing by the processing apparatus 10 is illustrated in FIG. 2.

First, the processing apparatus 10 recognizes a content filled in a transfer request form (an image) input by OCR reading, and converts the content into a digital character code. Next, the processing apparatus 10 determines whether a recognition result satisfies a predetermined error condition.

When the error condition is not satisfied, the processing apparatus 10 inputs a recognition result (transfer request content) to the accounting host 20. The accounting host 20 executes transfer processing, based on the input recognition result. On the other hand, when the error condition is satisfied, the processing apparatus 10 executes error processing. The error processing is any processing for performing human confirmation work. Thereafter, a recognition result (transfer request content) for which a correction or the like is performed by the human confirmation work is input to the accounting host 20. The accounting host 20 executes transfer processing, based on the input content. The processing apparatus 10 according to the present example embodiment accurately detects erroneous recognition by OCR, by determining whether a characteristic error condition is satisfied. Details are described later.

Now, a configuration of the processing apparatus 10 is described in detail. First, one example of a hardware configuration of the processing apparatus 10 is described. Each function included in the processing apparatus 10 is achieved by any combination of hardware and software mainly including a central processing unit (CPU) of any computer, a memory, a program loaded onto the memory, a storage unit such as a hard disk that stores the program (that can store not only a program previously stored from a phase of shipping an apparatus but also a program downloaded from a storage medium such as a compact disc (CD) or a server or the like on the Internet), and an interface for network connection. Then, it is appreciated by a person skilled in the art that there are a variety of modified examples of methods and apparatuses for the achievement.

Figure 3:
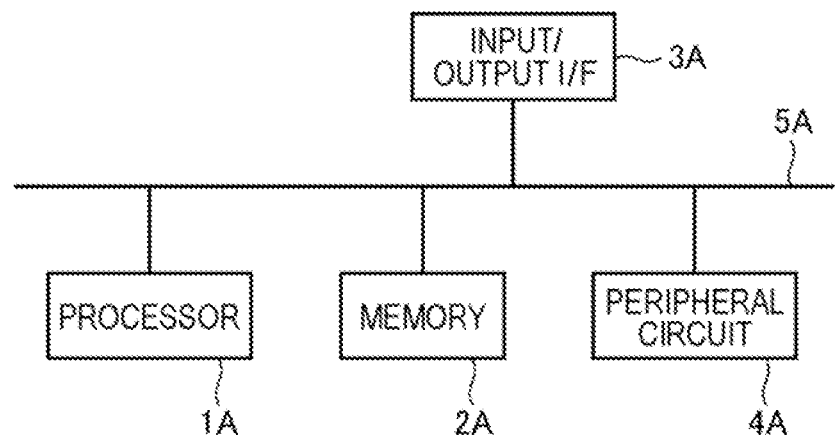
FIG. 3 is a diagram illustrating one example of a hardware configuration of the processing apparatus according to the present example embodiment.

FIG. 3 is a block diagram illustrating a hardware configuration of the processing apparatus 10. As illustrated in FIG. 3, the processing apparatus 10 includes a processor 1A, a memory 2A, an input/output interface 3A, a peripheral circuit 4A, and a bus 5A. The peripheral circuit 4A includes various modules. The processing apparatus 10 may not include the peripheral circuit 4A. Note that, the processing apparatus 10 may be configured by one physically and/or logically integrated apparatus, or may be configured by a plurality of physically and/or logically separated apparatuses. When the processing apparatus 10 is configured by a plurality of physically and/or logically separated apparatuses, each of the plurality of apparatuses can include the hardware configuration described above.

The bus 5A is a data transmission path for the processor 1A, the memory 2A, the peripheral circuit 4A, and the input/output interface 3A to mutually transmit and receive data. The processor 1A is, for example, an arithmetic processing apparatus such as a CPU and a graphics processing unit (GPU). The memory 2A is, for example, a memory such as a random access memory (RAM) and a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a touch panel, a physical button, a camera, and the like. The output apparatus is, for example, a display, a speaker, a printer, a mailer, and the like. The processor 1A can give an instruction to each of modules, and perform an arithmetic operation, based on an arithmetic result of each of the modules.

Figure 4:
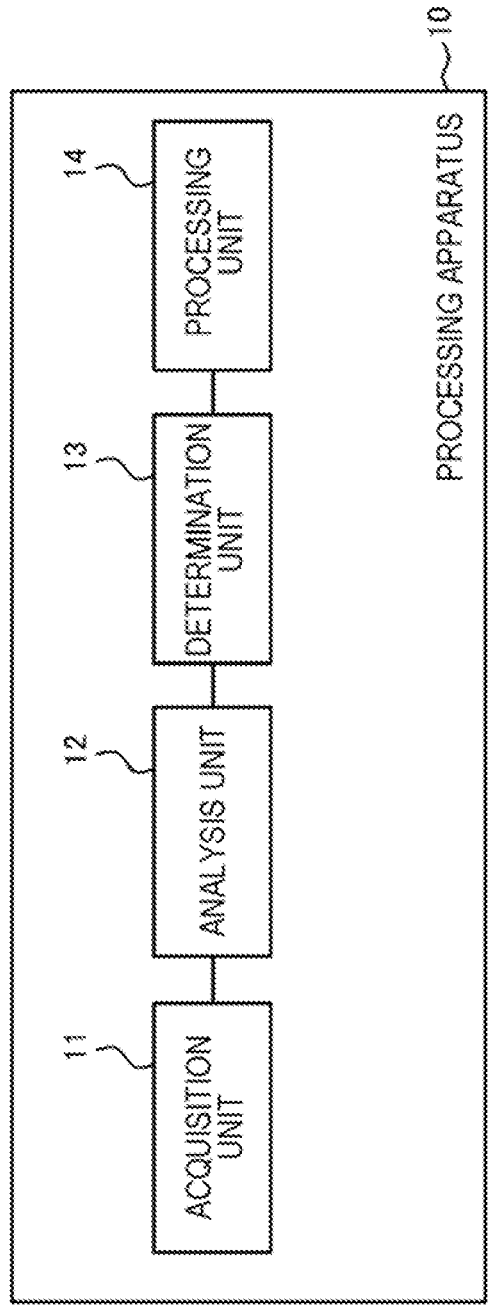
FIG. 4 is one example of a functional block diagram of the processing apparatus according to the present example embodiment.
Figure 5:
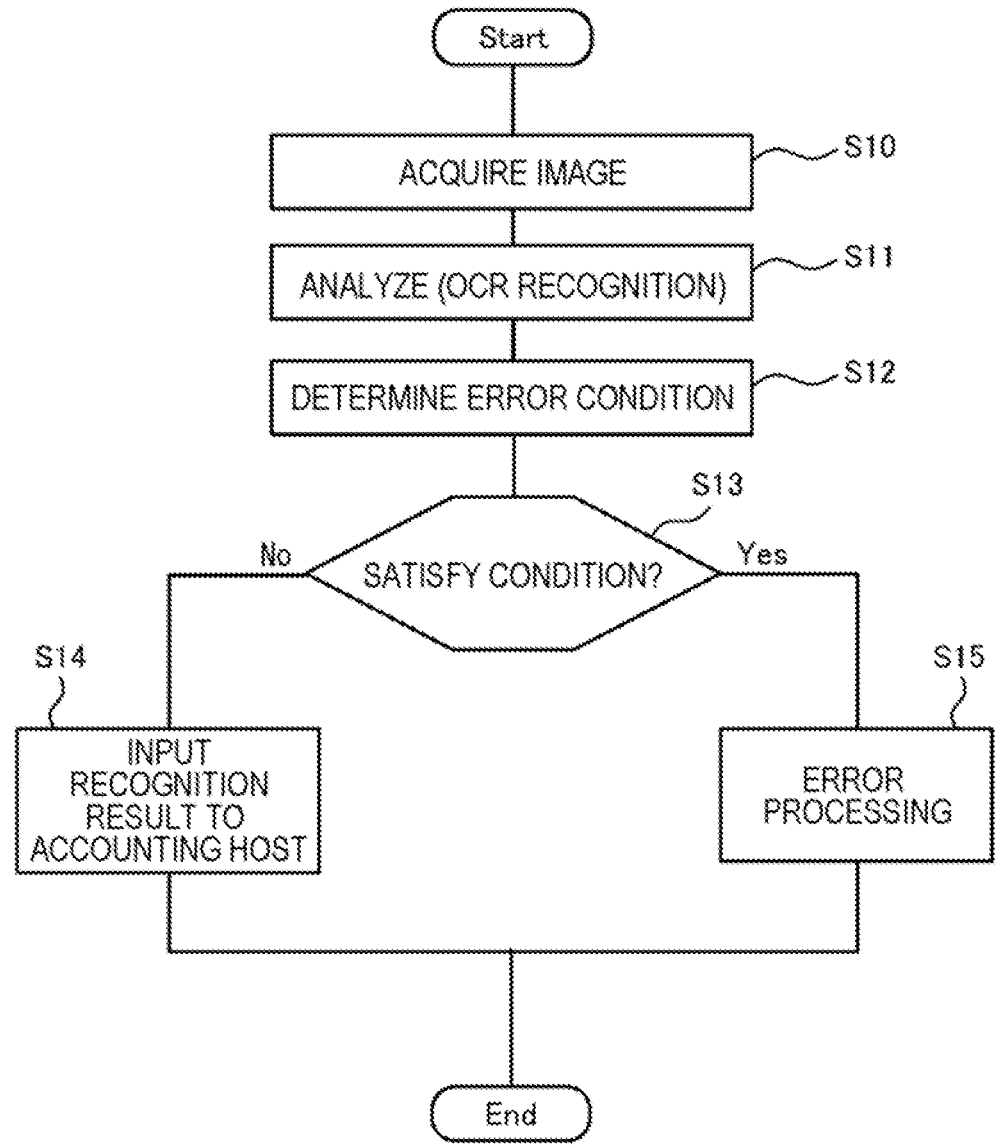
FIG. 5 is a flowchart illustrating one example of a flow of processing in the processing apparatus according to the present example embodiment.

Now, a functional configuration of the processing apparatus 10 is described in detail by use of a functional block diagram in FIG. 4 and a flowchart in FIG. 5. One example of a functional block diagram of the processing apparatus 10 is illustrated in FIG. 4. As illustrated, the processing apparatus 10 includes an acquisition unit 11, an analysis unit 12, a determination unit 13, and a processing unit 14.

Figure 6:
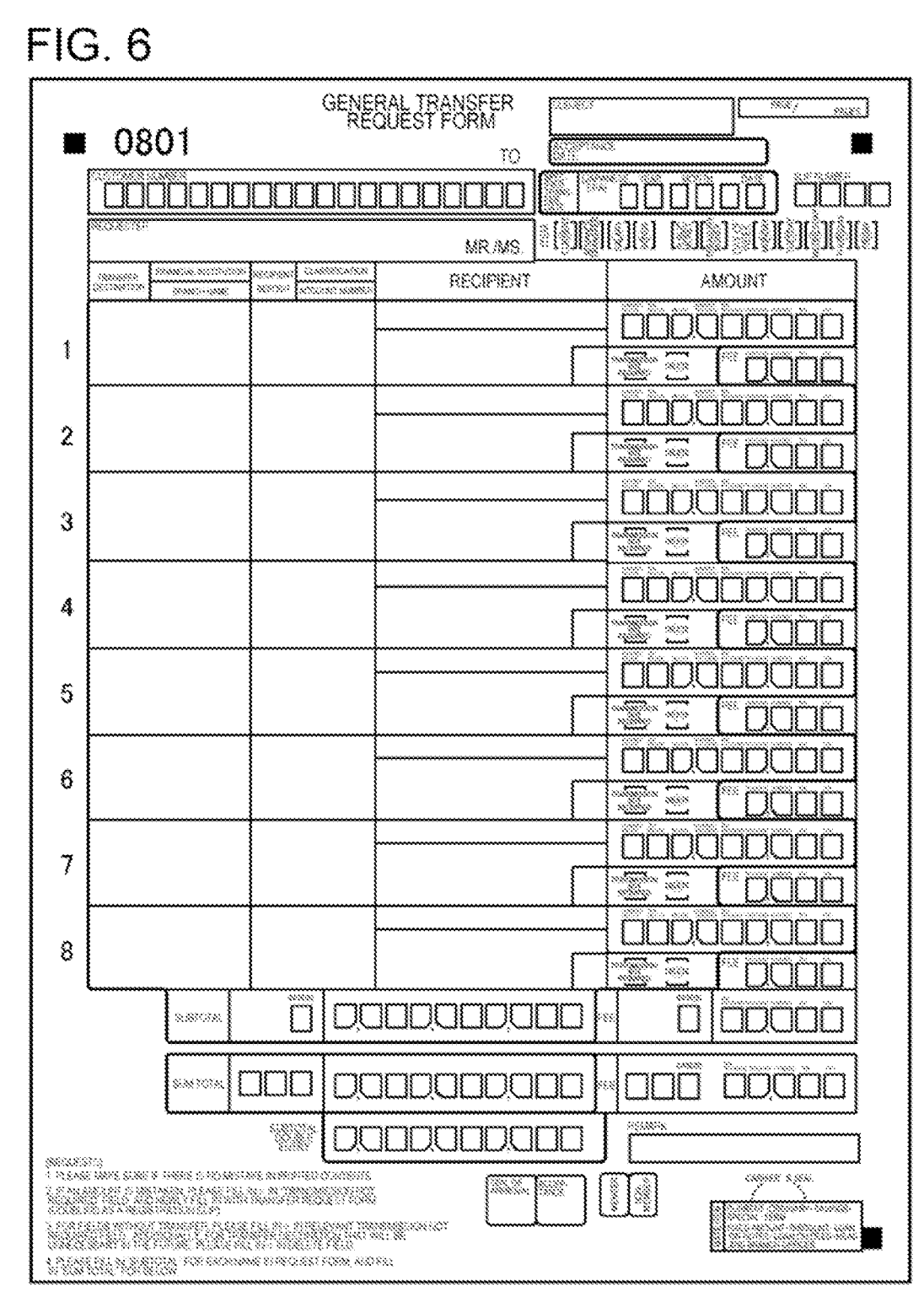

First, in S10, the acquisition unit 11 acquires an image of a fill-in form generated by an image scanner or the like. In the present example embodiment, a fill-in form is a transfer request form. One example of a transfer request form is illustrated in FIG. 6. Note that, the illustrated transfer request form is only one example, and the present invention is not limited to the transfer request form.

The illustrated transfer request form includes the following fill-in fields and the like.

"a field where information identifying a transfer requester (a customer number and a name of the transfer requester) is filled in"
"a field where an acceptance date is filled in"
"a field where a specified transfer date is filled in"
"a field where a day of the week of a specified transfer date is filled in"
"a field where an item is filled in"
"a field where a slip serial number is filled in"
"a field where transfer destination information (a financial institution name and a branch name), recipient information (an item, an account number, and a name), and a transfer content (a transfer amount) are filled in for each transfer request (for eight cases)"
"a field where a subtotal of a transfer amount is filled in"
"a field where a sum total of subtotals of a plurality of transfer request forms is filled in"
"a subtotal double entry field"

In this way, a transfer request form includes a plurality of first fill-in fields ("amount" fields illustrated in FIG. 6) where a numerical value is filled in, and a second fill-in field (a "subtotal field" illustrated in FIG. 6) where a sum total of the numerical values filled in a plurality of the first fill-in fields is filled in.

Note that, in the present description, "acquisition" includes at least any of "fetching, by a local apparatus, data stored in another apparatus or a storage medium (active acquisition)", for example, receiving by requesting or inquiring of the another apparatus, accessing the another apparatus or the storage medium and reading, and the like, based on a user input, or based on an instruction of a program, "inputting, into a local apparatus, data output from another apparatus (passive acquisition)", for example, waiting in a state where data transmitted from an external apparatus can be received, and receiving data transmitted from the external apparatus, based on a user input, or based on an instruction of a program, receiving data given from an external apparatus by distribution (or transmission, push notification, or the like), selecting and acquiring from received data or information, and "generating new data by editing of data (conversion into text, rearrangement of data, extraction of partial data, alteration of a file format, or the like) or the like, and acquiring the new data".

Returning to FIGS. 4 and 5, in S11, the analysis unit 12 analyzes the image of the transfer request form acquired by the acquisition unit 11 in S10, and recognizes a value filled in each of a plurality of fill-in fields included in the transfer request form. The analysis unit 12 recognizes a content filled in a transfer request form (an image) by OCR reading, and converts the content into a digital character code.

For example, the analysis unit 12 recognizes a numerical value filled in a plurality of the first fill-in fields (the "amount" fields illustrated in FIG. 6) where a transfer amount is filled in, and a numerical value filled in the second fill-in field (the "subtotal field" illustrated in FIG. 6) where a sum total of the numerical values filled in a plurality of the first fill-in fields is filled in. Note that, the analysis unit 12 can also recognize each of values (including a number, a character, a symbol, and the like) in other fill-in fields illustrated in FIG. 6.

Returning to FIGS. 4 and 5, in S12, the determination unit 13 determines whether a recognition result of the analysis unit 12 in S11 satisfies an error condition. An error condition according to the present example embodiment includes "a sum total of recognition results of a value filled in a plurality of the first fill-in fields and a recognition result of a value filled in the second fill-in field do not match each other". The determination unit 13 computes a sum total of the recognition results of the numerical value filled in a plurality of the first fill-in fields. Then, the determination unit 13 determines whether a computation result (the sum total of the recognition results of the numerical value filled in a plurality of the first fill-in fields) and the recognition result of the numerical value filled in the second fill-in field match each other. Note that, another error condition may be further set.

When a recognition result by the analysis unit 12 satisfies at least one error condition (Yes in S13), the processing unit 14 executes error processing (S15). For example, when the sum total of the recognition results of the numerical value filled in a plurality of the first fill-in fields and the recognition result of the numerical value filled in the second fill-in field do not match each other, the processing unit 14 executes error processing.

The error processing is any processing for performing human confirmation work. For example, the processing unit 14 registers, in a predetermined database (a database of transfer request information satisfying an error condition), the image acquired by the acquisition unit 11 in S10, the recognition result of the analysis unit 12 in S11, information identifying an error condition determined to be satisfied in S12, and the like, in association with one another. For example, an operator takes out, in a predetermined order, pieces of transfer request information registered on the database by operating a terminal apparatus, and displays the transfer request information on a display. Then, after performing confirmation work, correction work, and the like of the recognition result via the terminal apparatus, the operator inputs a recognition result (transfer request content) after correction to the accounting host 20.

On the other hand, when a recognition result by the analysis unit 12 does not satisfy any of the error conditions (No in S13), the processing unit 14 inputs the recognition result (transfer request content) by the analysis unit 12 to the accounting host 20 (S14).

The accounting host 20 executes transfer processing, based on the input transfer request content.

The processing apparatus 10 according to the present example embodiment described above detects erroneous recognition by OCR, by determining whether a sum total of recognition results of a value filled in a plurality of the first fill-in fields where a numerical value is filled in, and a recognition result of a value filled in the second fill-in field where a sum total of the numerical values filled in a plurality of the first fill-in fields is filled in match each other. Detecting, through various pieces of characteristic processing, erroneous recognition by OCR improves detection accuracy and can reduce human confirmation work.

Second Example Embodiment

A processing apparatus 10 according to the present example embodiment differs in details of an error condition from that according to the first example embodiment. Description is given below in detail.

A transfer form according to the present example embodiment includes a plurality of third fill-in fields where the same value is filled in. In a case of the example illustrated in FIG. 6, a subtotal field and a subtotal double entry field correspond to the third fill-in fields. The subtotal field is a field where a transfer requester fills in a value, and the subtotal double entry field is a field where a worker (a worker of a financial institution) fills in a value.

An analysis unit 12 recognizes a content filled in a transfer request form (an image) by OCR reading, and recognizes values filled in a plurality of the third fill-in fields (S11 in FIG. 5). Note that, the analysis unit 12 can also recognize each of values (including a number, a character, a symbol, and the like) in other fill-in fields illustrated in FIG. 6.

Then, an error condition according to the present example embodiment includes "recognition results of values filled in a plurality of the third fill-in fields do not match one another". A determination unit 13 determines whether the recognition result of the analysis unit 12 in S11 satisfies the error condition (S12 in FIG. 5). Note that, another error condition (e.g., an error condition described in the first example embodiment) may be further set.

When a recognition result by the analysis unit 12 satisfies at least one error condition (Yes in S13 in FIG. 5), a processing unit 14 executes error processing (S15 in FIG. 5). For example, when recognition results of values filled in a plurality of the third fill-in fields do not match one another, the processing unit 14 executes error processing. Details of the error processing are similar to those according to the first example embodiment.

Note that, other components of the processing apparatus 10 are similar to those according to the first example embodiment.

The processing apparatus 10 according to the present example embodiment described above detects erroneous recognition by OCR, by determining whether recognition results of values filled in a plurality of the third fill-in fields where the same value is filled in match one another. Detecting, through various pieces of characteristic processing, erroneous recognition by OCR improves detection accuracy and can reduce human confirmation work. For example, detection accuracy of erroneous recognition by OCR is further improved by setting both error conditions described in the first and second example embodiments.

Third Example Embodiment

A processing apparatus 10 according to the present example embodiment differs in details of an error condition from that according to each of the first and second example embodiments. Description is given below in detail.

As in an example illustrated in FIG. 6, a transfer form according to the present example embodiment includes an item fill-in field where an item is filled in, and a specified transfer date fill-in field where a specified transfer date is filled in.

An analysis unit 12 recognizes a content filled in a transfer request form (an image) by OCR reading, and recognizes a value filled in the item fill-in field, and a value filled in the specified transfer date fill-in field (S11 in FIG. 5). Note that, the analysis unit 12 can also recognize each of values (including a number, a character, a symbol, and the like) in other fill-in fields illustrated in FIG. 6.

Then, an error condition according to the present example embodiment includes "recognition results of values filled in the item fill-in field and the specified transfer date fill-in field do not satisfy a condition (specified date condition) of a specifiable specified transfer date determined for each item".

A determination unit 13 determines, based on condition information indicating a specified date condition as illustrated in FIG. 7, whether the recognition result of the value filled in the item fill-in field and the recognition result of the value filled in the specified transfer date fill-in field satisfy the specified date condition (S12 in FIG. 5).

Note that, another error condition (e.g., an error condition described in the first and/or second example embodiments) may be further set. Moreover, a kind of item exemplified herein, and details of the specified date condition are only one example, and the present invention is not limited thereto.

When a recognition result by the analysis unit 12 satisfies at least one error condition (Yes in S13 in FIG. 5), a processing unit 14 executes error processing (S15 in FIG. 5). For example, when the recognition result of the value filled in the item fill-in field and the recognition result of the value filled in the specified transfer date fill-in field do not satisfy the specified date condition, the processing unit 14 executes error processing. Details of the error processing are similar to those according to the first example embodiment.

Note that, other components of the processing apparatus 10 are similar to those according to the first or second example embodiment.

The processing apparatus 10 according to the present example embodiment described above detects erroneous recognition by OCR, by determining whether a recognition result of a value filled in the item fill-in field and a recognition result of a value filled in the specified transfer date fill-in field satisfy a condition (specified date condition) of a specifiable specified transfer date determined for each item. Detecting, through various pieces of characteristic processing, erroneous recognition by OCR improves detection accuracy and can reduce human confirmation work. For example, detection accuracy of erroneous recognition by OCR is further improved by setting a plurality of error conditions described in the first, second, and third example embodiments.

Fourth Example Embodiment

A processing apparatus 10 according to the present example embodiment differs in details of an error condition from that according to each of the first, second, and third example embodiments. Description is given below in detail.

As in an example illustrated in FIG. 6, a transfer form according to the present example embodiment includes a date fill-in field (specified transfer date fill-in field) where a date (a specified transfer date) is filled in, and a day-of-week fill-in field where a day of the week of the specified transfer date is filled in.

An analysis unit 12 recognizes a content filled in a transfer request form (an image) by OCR reading, and recognizes a value filled in the date fill-in field, and a value filled in the day-of-week fill-in field (S11 in FIG. 5). Note that, the analysis unit 12 can also recognize each of values (including a number, a character, a symbol, and the like) in other fill-in fields illustrated in FIG. 6.

Then, an error condition according to the present example embodiment includes "a recognition result of a value filled in the date fill-in field and a recognition result of a value filled in the day-of-week fill-in field contradict".

A determination unit 13 determines, based on calendar information indicating a date and a day of the week, whether the recognition result of the value filled in the date fill-in field and the recognition result of the value filled in the day-of-week fill-in field contradict (S12 in FIG. 5). "Contradiction" herein means not matching an association relation between a date and a day of the week indicated by the calendar information.

Note that, another error condition (e.g., at least one of error conditions described in the first, second, and third example embodiments) may be further set.

When a recognition result by the analysis unit 12 satisfies at least one error condition (Yes in S13 in FIG. 5), a processing unit 14 executes error processing (S15 in FIG. 5). For example, when the recognition result of the value filled in the date fill-in field and the recognition result of the value filled in the day-of-week fill-in field contradict, the processing unit 14 executes error processing. Details of the error processing are similar to those according to the first example embodiment.

Note that, other components of the processing apparatus 10 are similar to those according to the first, second, or third example embodiment.

The processing apparatus 10 according to the present example embodiment described above detects erroneous recognition by OCR, by determining whether a recognition result of a value filled in the date fill-in field and a recognition result of a value filled in the day-of-week fill-in field contradict. Detecting, through various pieces of characteristic processing, erroneous recognition by OCR improves detection accuracy and can reduce human confirmation work. For example, detection accuracy of erroneous recognition by OCR is further improved by setting a plurality of error conditions described in the first, second, third, and fourth example embodiments.

Fifth Example Embodiment

A processing apparatus 10 according to the present example embodiment differs in details of an error condition from that according to each of the first, second, third, and fourth example embodiments. Description is given below in detail.

An analysis unit 12 analyzes an image with a plurality of image analysis engines, and recognizes values filled in a plurality of fill-in fields included in a transfer form (fill-in form) (S11 in FIG. 5). A plurality of the image analysis engines differ from one another in an algorithm, setting, and the like of an image analysis.

Then, an error condition according to the present example embodiment includes "recognition results of a plurality of image analysis engines do not match one another". A determination unit 13 determines whether recognition results of a plurality of the image analysis engines match one another (S12 in FIG. 5). Note that, another error condition (e.g., at least one of error conditions described in the first, second, third, and fourth example embodiments) may be further set.

When a recognition result by the analysis unit 12 satisfies at least one error condition (Yes in S13 in FIG. 5), a processing unit 14 executes error processing (S15 in FIG. 5). For example, when recognition results of a plurality of the image analysis engines do not match one another, the processing unit 14 executes error processing. Details of the error processing are similar to those according to the first example embodiment.

Note that, other components of the processing apparatus 10 are similar to those according to the first, second, third, or fourth example embodiment.

The processing apparatus 10 according to the present example embodiment described above detects erroneous recognition by OCR, by determining whether recognition results of a plurality of image analysis engines match one another. Detecting, through various pieces of characteristic processing, erroneous recognition by OCR improves detection accuracy and can reduce human confirmation work. For example, detection accuracy of erroneous recognition by OCR is further improved by setting a plurality of error conditions described in the first, second, third, fourth, and fifth example embodiments.

Sixth Example Embodiment

Figure 8:
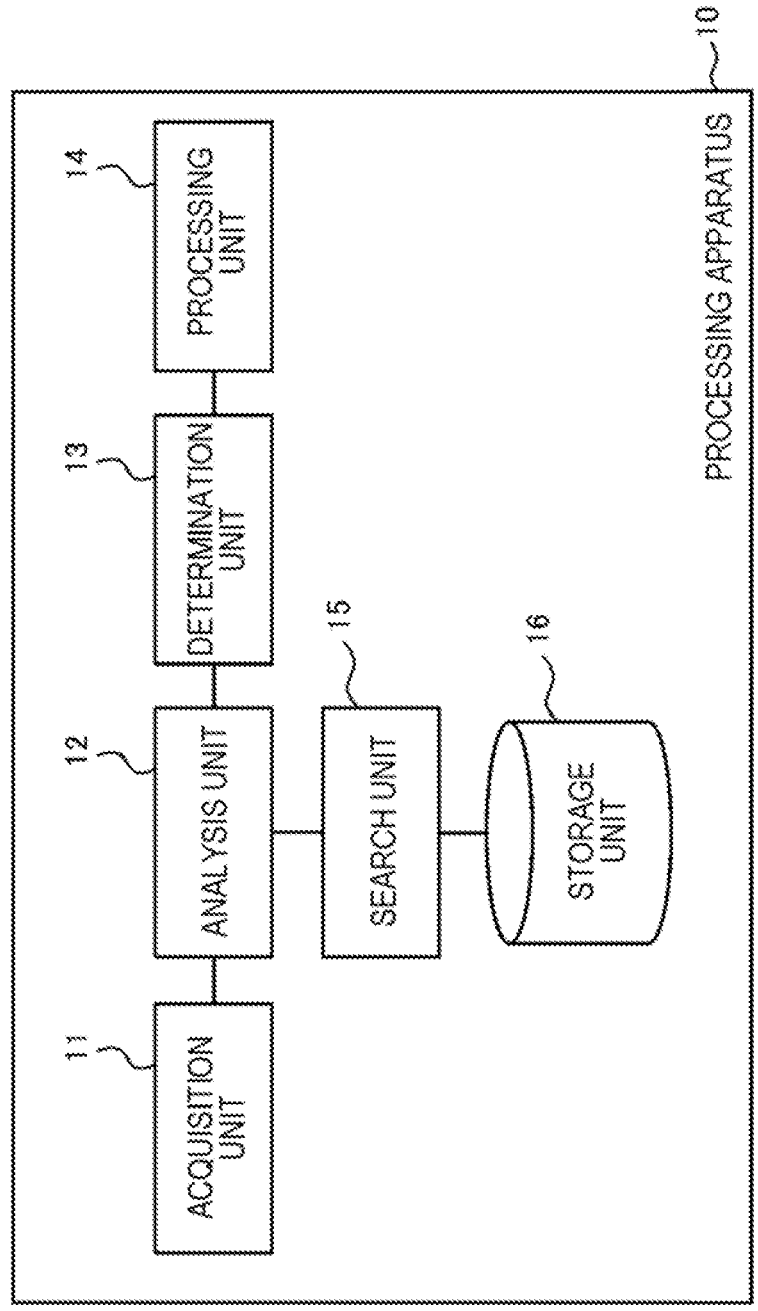
FIG. 8 is one example of a functional block diagram of the processing apparatus according to the present example embodiment.
Figure 9:
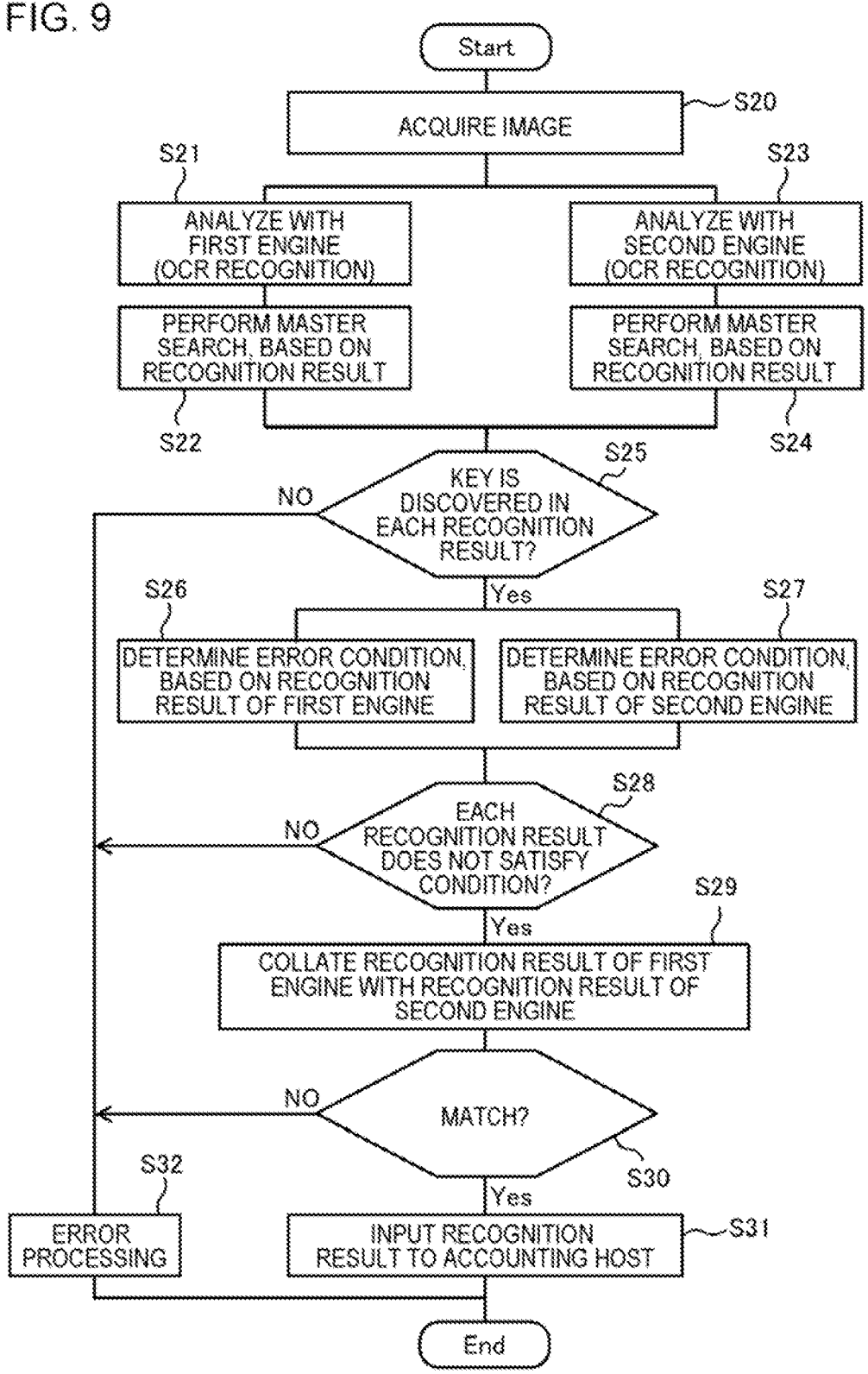
FIG. 9 is a flowchart illustrating one example of a flow of processing in the processing apparatus according to the present example embodiment.

One example of a functional block diagram of a processing apparatus 10 according to the present example embodiment is illustrated in FIG. 8. As illustrated, the processing apparatus 10 includes an acquisition unit 11, an analysis unit 12, a determination unit 13, a processing unit 14, a search unit 15, and a storage unit 16. A flowchart in FIG. 9 illustrates one example of a flow of processing in the processing apparatus 10 according to the present example embodiment.

First, in S20, the acquisition unit 11 acquires an image of a transfer form (fill-in form) generated by an image scanner or the like. The analysis unit 12 analyzes, with two image analysis engines (that may be three or more image analysis engines), the image of the transfer request form acquired by the acquisition unit 11 in S20, and recognizes a value filled in each of a plurality of fill-in fields included in the transfer request form (S21 and S23).

Next, the search unit 15 searches the storage unit 16 with, as a key, a recognition result of a value filled in a key fill-in field of each of two image analysis engines (S22 and S24).

As illustrated in FIG. 10, the storage unit 16 stores a value (registration information) in a fill-in field of the transfer request form, in association with customer identification information (a "customer number" illustrated). For example, a transfer requester or the like who regularly performs a transfer to the same party registers information of the party in association with his/her own customer identification information. As information to be registered, at least some of a financial institution name, a branch name, an item, an account number, and a name, and the like are exemplified.

In a case of the example illustrated in FIG. 6, a key fill-in field is a field where a customer number is filled in. In other words, the search unit 15 searches the storage unit 16 with, as a key, a recognition result of the field where a customer number is filled in. Then, when a key can be discovered in the storage unit 16, the search unit 15 takes out registration information associated with the key, and updates a recognition result by the analysis unit 12. Specifically, some of recognition results of a plurality of the fill-in fields (at least some of a financial institution name, a branch name, an item, an account number, and a name, and the like) included in the transfer request form are updated to previously registered information.

Next, when at least either of the recognition results of the values each filled in the key fill-in field of each of the two image analysis engines cannot be discovered in the storage unit 16 (No in S25), the processing unit 14 executes error processing (S32).

On the other hand, when each of the recognition results of the values each filled in the key fill-in field of each of the two image analysis engines can be discovered in the storage unit 16 (Yes in S25), the determination unit 13 determines whether the recognition result by each of the two image analysis engines satisfies an error condition (S26 and S27). Herein, whether at least one of error conditions described in the first to fourth example embodiments is satisfied is determined.

When any of the error conditions is satisfied (No in S28), the processing unit 14 executes error processing (S32).

On the other hand, when any of the error conditions is not satisfied (Yes in S28), the determination unit 13 collates the recognition results of the values of a plurality of the fill-in fields by the two image analysis engines, and determines whether the recognition results match each other (S29).

When the recognition results do not match (No in S30), the processing unit 14 executes error processing (S32).

On the other hand, when the recognition results match (Yes in S30), the processing unit 14 inputs, to an accounting host 20, a transfer request generated based on the recognition result by the analysis unit 12 and registration information acquired from the storage unit 16 by the search unit 15 (S31).

Note that, other components of the processing apparatus 10 are similar to those according to the first, second, third, fourth, or fifth example embodiment.

The processing apparatus 10 according to the present example embodiment described above improves detection accuracy by detecting, through various pieces of characteristic processing, erroneous recognition by OCR. This enables the accounting host 20 to execute transfer processing without human confirmation work.

Modified Example

Herein, a modified example being applicable to all example embodiments is described. Although it has been assumed so far that a fill-in form is a transfer request form, a fill-in form may be another kind of form. Then, a processing apparatus 10 may be utilized outside a financial institution.

Some or all of the above-described example embodiments can also be described as, but are not limited to, the following supplementary notes.

1. A processing apparatus including:
   an acquisition means for acquiring an image of a fill-in form including a plurality of first fill-in fields where a numerical value is filled in, and a second fill-in field where a sum total of the numerical values filled in a plurality of the first fill-in fields is filled in;
   an analysis means for analyzing the image, and recognizing a value filled in a plurality of the first fill-in fields and a value filled in the second fill-in field;
   a determination means for determining whether a sum total of recognition results of a value filled in a plurality of the first fill-in fields and a recognition result of a value filled in the second fill-in field match each other; and
   a processing means for executing error processing when a sum total of recognition results of a value filled in a plurality of the first fill-in fields and a recognition result of a value filled in the second fill-in field do not match each other.

2. The processing apparatus according to supplementary note 1, wherein
   the fill-in form is a transfer request form, and
   the first fill-in field is a fill-in field where a transfer amount is filled in.

3. The processing apparatus according to supplementary note 1 or 2, wherein
   the fill-in form includes a plurality of third fill-in fields where the same value is filled in,
   the analysis means analyzes the image, and recognizes a value filled in each of a plurality of the third fill-in fields,
   the determination means determines whether recognition results of values filled in a plurality of the third fill-in fields match one another, and
   the processing means executes error processing when recognition results of values filled in a plurality of the third fill-in fields do not match one another.

4. The processing apparatus according to supplementary note 3, wherein
   the fill-in form is a transfer request form, and
   a plurality of the third fill-in fields include a fill-in field where a transfer requester fills in a value, and a fill-in field where a worker fills in a value.

5. The processing apparatus according to any one of supplementary notes 1 to 4, wherein
   the fill-in form is a transfer request form, and includes an item fill-in field where an item is filled in, and a specified transfer date fill-in field where a specified transfer date is filled in,
   the analysis means analyzes the image, and recognizes a value filled in the item fill-in field, and a value filled in the specified transfer date fill-in field,
   the determination means determines, based on condition information determining a condition of a specifiable specified transfer date for each of the items, whether a recognition result of a value filled in the item fill-in field, and a recognition result of a value filled in the specified transfer date fill-in field satisfy the condition, and
   the processing means executes error processing when a recognition result of a value filled in the item fill-in field, and a recognition result of a value filled in the specified transfer date fill-in field do not satisfy the condition.

6. The processing apparatus according to any one of supplementary notes 1 to 5, wherein
   the fill-in form includes a date fill-in field where a date is filled in, and a day-of-week fill-in field where a day of a week is filled in,
   the analysis means analyzes the image, and recognizes a value filled in the date fill-in field, and a value filled in the day-of-week fill-in field,
   the determination means determines, based on calendar information indicating a date and a day of a week, whether a recognition result of a value filled in the date fill-in field and a recognition result of a value filled in the day-of-week fill-in field contradict, and
   the processing means executes error processing when a recognition result of a value filled in the date fill-in field, and a recognition result of a value filled in the day-of-week fill-in field contradict.

7. The processing apparatus according to supplementary note 6, wherein the fill-in form is a transfer request form, and
the date fill-in field is a fill-in field where a specified transfer date is filled in.

8. The processing apparatus according to any one of supplementary notes 1 to 7, wherein
the analysis means analyzes the image with a plurality of image analysis engines, and recognizes values filled in a plurality of fill-in fields included in the fill-in form, and
the processing means executes error processing when recognition results of a plurality of the image analysis engines do not match one another.

9. A processing apparatus including:
an acquisition means for acquiring an image of a transfer request form including a plurality of fill-in fields;
an analysis means for recognizing, with a plurality of image analysis engines, a value in the plurality of fill-in fields included in the transfer request form;
a search means for searching a storage unit with, as a key, a recognition result of a value filled in a key fill-in field of each of a plurality of the image analysis engines;
a determination means for determining whether a value satisfying an error condition is present in recognition results of values in a plurality of fill-in fields by a plurality of the image analysis engines; and
a processing means for executing error processing when recognition results of a plurality of the image analysis engines do not match one another, when the key generated by any of a plurality of the image analysis engines cannot be found in the storage unit, or when a value satisfying the error condition is present in recognition results of values in a plurality of fill-in fields by a plurality of the image analysis engines.

10. A processing method including:
by a computer,
acquiring an image of a fill-in form including a plurality of first fill-in fields where a numerical value is filled in, and a second fill-in field where a sum total of the numerical values filled in a plurality of the first fill-in fields is filled in;
analyzing the image, and recognizing a value filled in a plurality of the first fill-in fields and a value filled in the second fill-in field;
determining whether a sum total of recognition results of a value filled in a plurality of the first fill-in fields and a recognition result of a value filled in the second fill-in field match each other; and
executing error processing when a sum total of recognition results of a value filled in a plurality of the first fill-in fields and a recognition result of a value filled in the second fill-in field do not match each other.

11. A program that causes a computer to function as:
an acquisition means for acquiring an image of a fill-in form including a plurality of first fill-in fields where a numerical value is filled in, and a second fill-in field where a sum total of the numerical values filled in a plurality of the first fill-in fields is filled in;
an analysis means for analyzing the image, and recognizing a value filled in a plurality of the first fill-in fields and a value filled in the second fill-in field;
a determination means for determining whether a sum total of recognition results of a value filled in a plurality of the first fill-in fields and a recognition result of a value filled in the second fill-in field match each other; and
a processing means for executing error processing when a sum total of recognition results of a value filled in a plurality of the first fill-in fields and a recognition result of a value filled in the second fill-in field do not match each other.

While the invention of the present application has been described above with reference to the example embodiments (and examples), the invention of the present application is not limited to the example embodiments (and examples) described above. Various modifications understandable to a person skilled in the art can be made to a configuration and details of the invention of the present application within the scope of the invention of the present application.

This application is based upon and claims the benefit of priority from Japanese Patent Application No. 2019-082587, filed on Apr. 24, 2019, the disclosure of which is incorporated herein in its entirety by reference.

The invention claimed is:

1. A processing apparatus comprising:
at least one memory configured to store one or more instructions; and
at least one processor configured to execute the one or more instructions to:
acquire an image of a transfer request form including a plurality of fill-in fields;
recognize, with a plurality of image analysis engines, a value in the plurality of fill-in fields included in the transfer request form;
search a storage unit with, as a key, a recognition result of a value filled in a key fill-in field of each of the plurality of the image analysis engines, wherein the key is customer identification information;
determine whether a value satisfying an error condition is present in recognition results of values in the plurality of fill-in fields by the plurality of the image analysis engines; and
execute error processing when the key generated by any of a plurality of the image analysis engines cannot be found in the storage unit storing information about payees in association with the customer identification information,
wherein the information about payees includes at least one of a financial institution name, a branch name, an item, an account number, and a name, and
wherein the at least one processor is further configured to execute the one or more instructions to, when the key is found in the storage unit, take out the stored information about the payees associated with the key, and update the recognition result with the stored information about the payees.

2. The processing apparatus according to claim 1, wherein the at least one processor is further configured to execute the one or more instructions to:
execute error processing when recognition results of the plurality of the image analysis engines do not match one another, or when the value satisfying the error condition is present in the recognition results of the values in the plurality of fill-in fields by the plurality of the image analysis engines.

3. The processing apparatus according to claim 1, wherein the at least one processor is further configured to execute the one or more instructions to:
acquire the image of the transfer request form including a plurality of first fill-in fields where a value is filled in, and a second fill-in field where a sum total of the values filled in the plurality of the first fill-in fields is filled in;
analyze the image, and recognize a value filled in the plurality of the first fill-in fields and a value filled in the second fill-in field;

determine whether a sum total of recognition results of the value filled in the plurality of the first fill-in fields and a recognition result of the value filled in the second fill-in field match each other; and execute error processing when the sum total of recognition results of the value filled in the plurality of the first fill-in fields and the recognition result of the value filled in the second fill-in field do not match each other.

4. The processing apparatus according to claim 3, wherein the transfer request form includes a plurality of third fill-in fields where a same value is filled in, the at least one processor is further configured to execute the one or more instructions to:

analyze the image, and recognize a value filled in each of the plurality of the third fill-in fields, determine whether recognition results of values filled in the plurality of the third fill-in fields match one another, and execute error processing when the recognition results of the values filled in the plurality of the third fill-in fields do not match one another.

5. The processing apparatus according to claim 4, wherein the plurality of the third fill-in fields include a fill-in field where a transfer requester fills in a value, and a fill-in field where a worker fills in a value.

6. The processing apparatus according to claim 3, wherein the transfer request form includes an item fill-in field where an item is filled in, and a specified transfer date fill-in field where a specified transfer date is filled in, the at least one processor is further configured to execute the one or more instructions to analyze the image, and recognize a value filled in the item fill-in field, and a value filled in the specified transfer date fill-in field, determine, based on condition information determining a condition of a specifiable specified transfer date for each of the items, whether a recognition result of the value filled in the item fill-in field, and a recognition result of the value filled in the specified transfer date fill-in field satisfy the condition, and execute error processing when the recognition result of the value filled in the item fill-in field, and the recognition result of the value filled in the specified transfer date fill-in field do not satisfy the condition.

7. The processing apparatus according to claim 3, wherein the transfer request form includes a date fill-in field where a date is filled in, and a day-of-week fill-in field where a day of a week is filled in, the at least one processor is further configured to execute the one or more instructions to analyze the image, and recognize a value filled in the date fill-in field, and a value filled in the day-of-week fill-in field, determine, based on calendar information indicating a date and a day of a week, whether a recognition result of the value filled in the date fill-in field and a recognition result of the value filled in the day-of-week fill-in field contradict, and execute error processing when the recognition result of the value filled in the date fill-in field, and the recognition result of the value filled in the day-of-week fill-in field contradict.

8. The processing apparatus according to claim 7, wherein the date fill-in field is a fill-in field where a specified transfer date is filled in.

9. The processing apparatus according to claim 1, wherein a first fill-in field is a fill-in field where a transfer amount is filled in.

10. A processing method comprising:

by a computer, acquiring an image of a transfer request form including a plurality of fill-in fields;

recognizing, with a plurality of image analysis engines, a value in the plurality of fill-in fields included in the transfer request form;

searching a storage unit with, as a key, a recognition result of a value filled in a key fill-in field of each of the plurality of the image analysis engines, wherein the key is customer identification information;

determining whether a value satisfying an error condition is present in recognition results of values in the plurality of fill-in fields by the plurality of the image analysis engines; and executing error processing when the key generated by any of the plurality of the image analysis engines cannot be found in the storage unit storing information about payees in association with the customer identification information, wherein the information about payees includes at least one of a financial institution name, a branch name, an item, an account number, and a name, and wherein when the key is found in the storage unit, the processing method includes taking out the stored information about the payees associated with the key, and updating the recognition result with the stored information about the payees.

11. A non-transitory storage medium storing a program that causes a computer to:

acquire an image of a transfer request form including a plurality of fill-in fields;

recognize, with a plurality of image analysis engines, a value in the plurality of fill-in fields included in the transfer request form;

search a storage unit with, as a key, a recognition result of a value filled in a key fill-in field of each of the plurality of the image analysis engines, wherein the key is customer identification information;

determine whether a value satisfying an error condition is present in recognition results of values in the plurality of fill-in fields by the plurality of the image analysis engines; and execute error processing when the key generated by any of a plurality of the image analysis engines cannot be found in the storage unit storing information about payees in association with the customer identification information, wherein the information about payees includes at least one of a financial institution name, a branch name, an item, an account number, and a name, and wherein when the key is found in the storage unit, the program causes the computer to take out the stored information about the payees associated with the key, and update the recognition result with the stored information about the payees.

* * * * *